Nov. 22, 1960

J. W. HICKS 2,961,043

PULP MOLDING APPARATUS

Filed Jan. 22, 1957

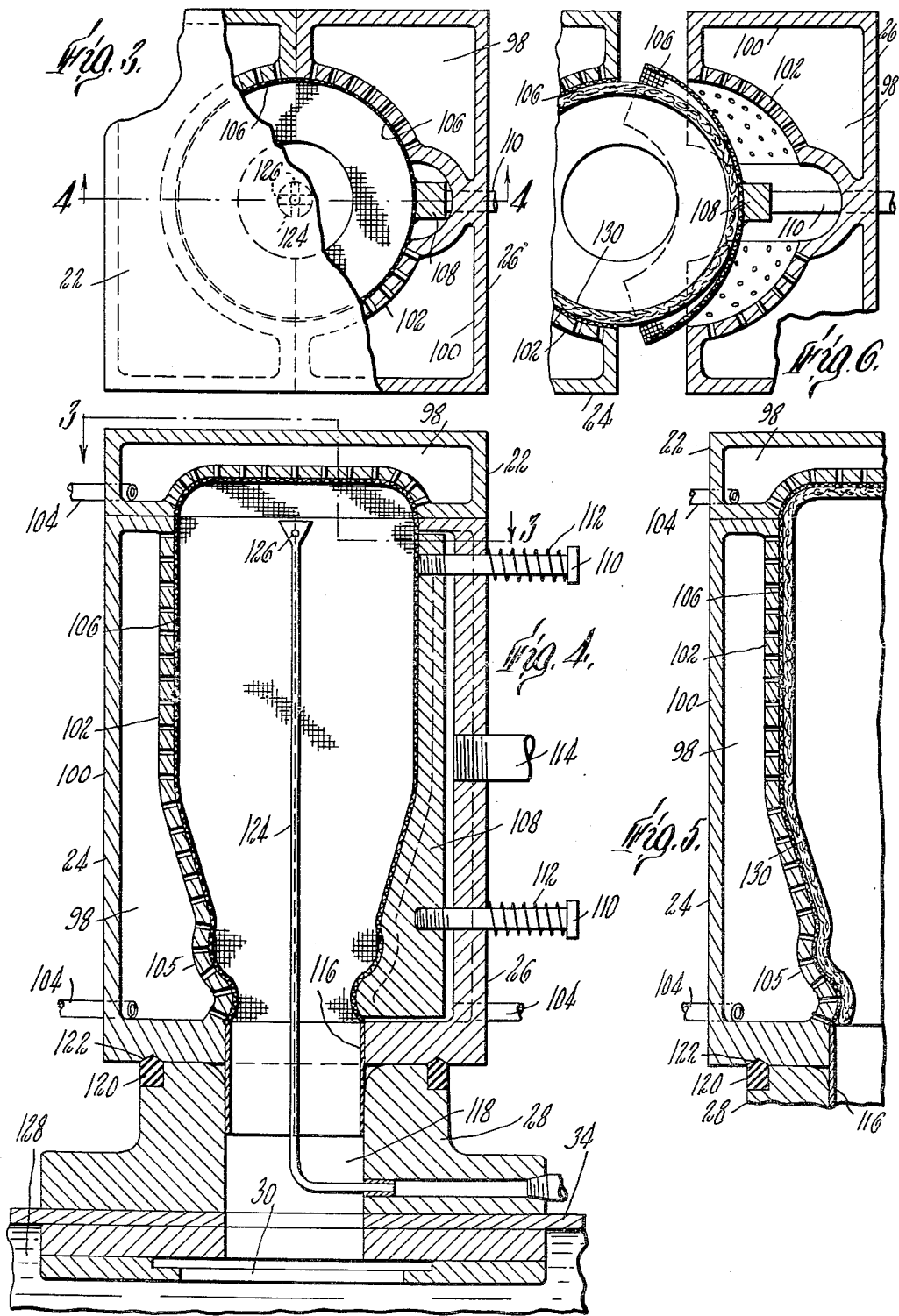

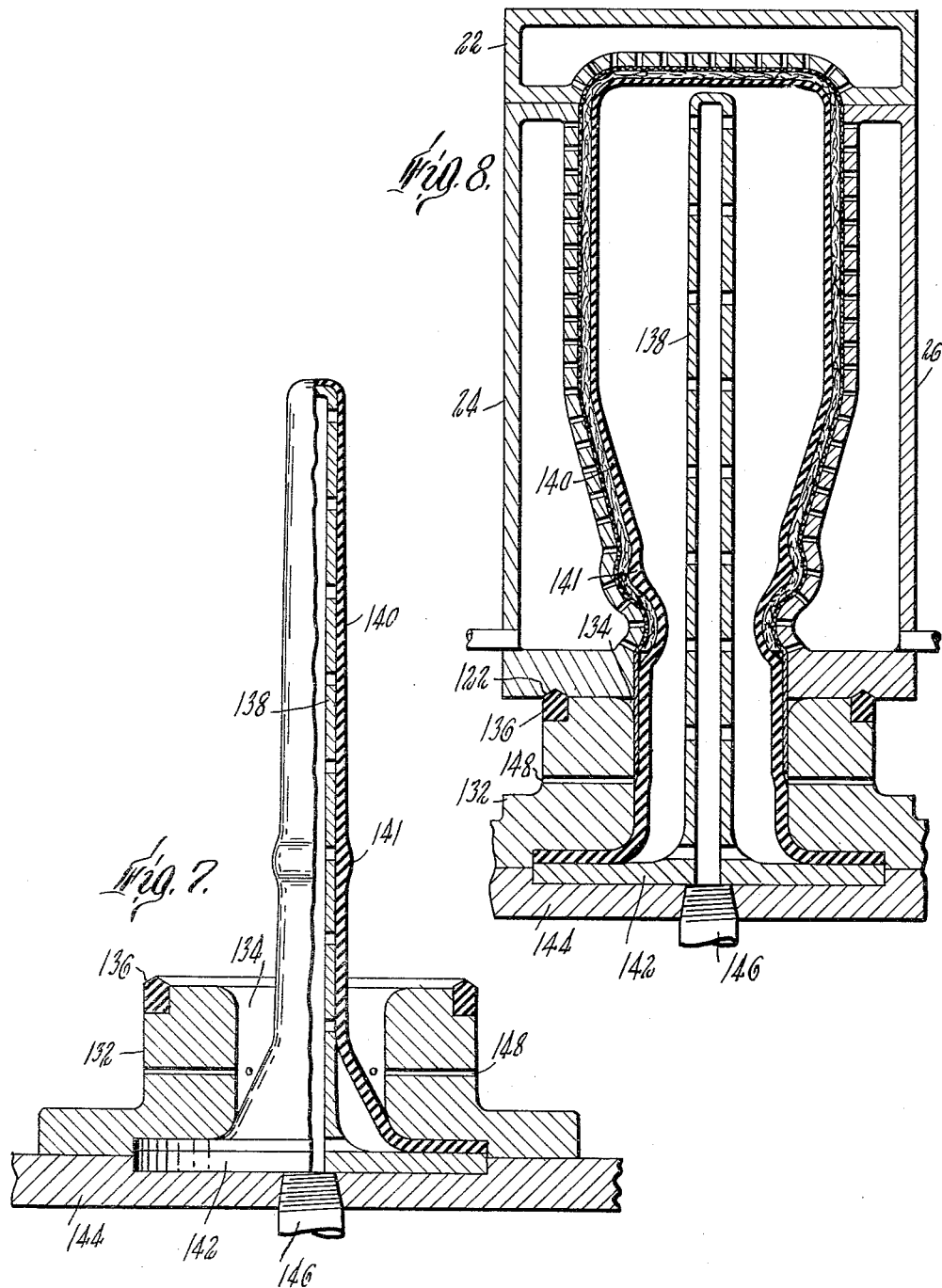

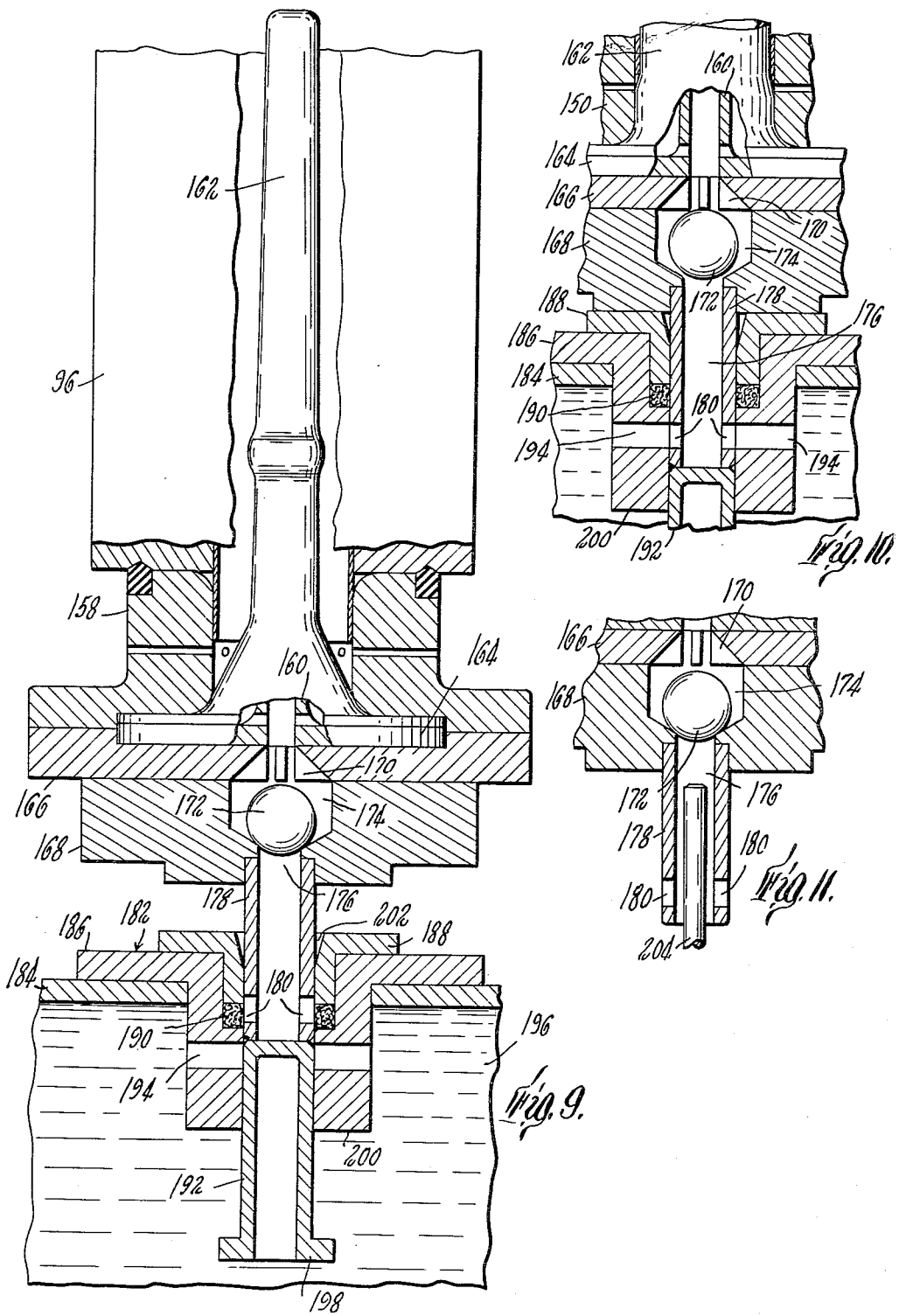

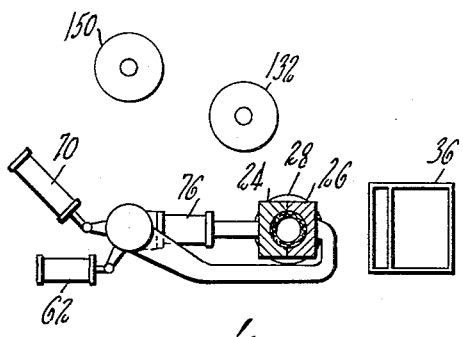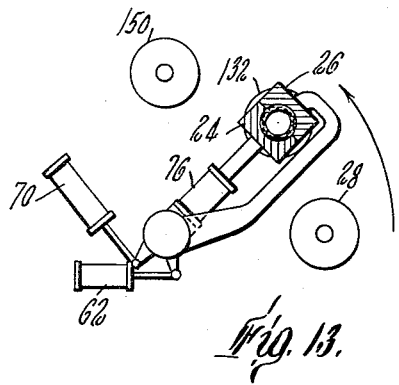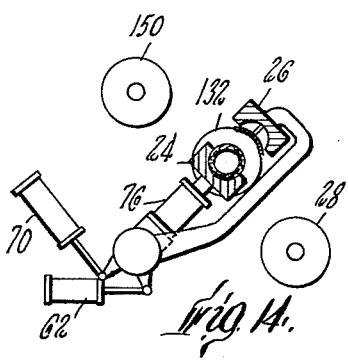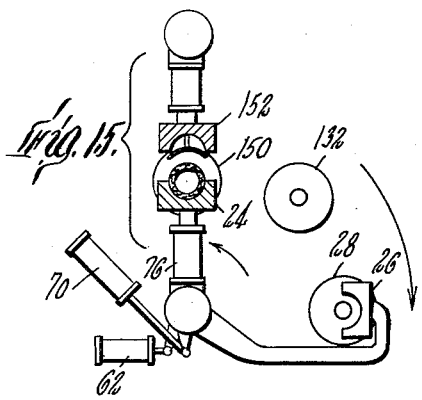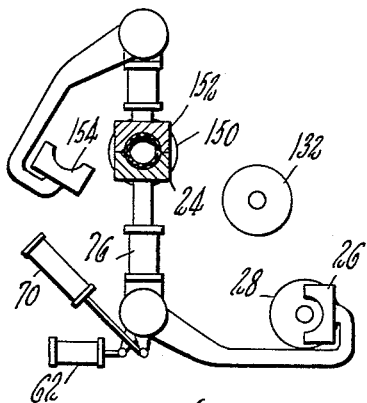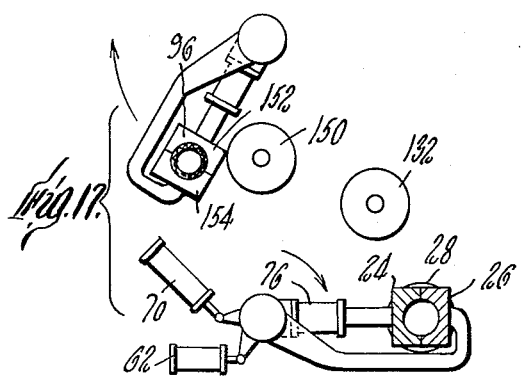

United States Patent Office 2,961,043
Patented Nov. 22, 1960

2,961,043
PULP MOLDING APPARATUS

Justin W. Hicks, Chebeague Island, Maine, assignor, by mesne assignments, to Diamond National Corporation, New York, N.Y., a corporation of Delaware Filed Jan. 22, 1957, Ser. No. 635,214

8 Claims. (Cl. 162—401)

This invention relates to a method and apparatus adapted to the manufacture of articles from fibrous pulp material and more particularly a method and apparatus adapted to the manufacture of containers having an area of restricted cross-section intermediate the body and the container opening.

Methods and apparatus for the manufacture of containers from fibrous pulp material are well known in the art. A principal method of manufacture of such containers involves the deposit of material on the foraminous die surface and the extraction of moisture from the material through the die surface by means of a pressure differential, thus drying and forming the material in the desired container shape such that it may be handled for further processing. Both wide-mouth and narrow-necked containers have been manufactured in accordance with this method, the former type formed with an open mold and the latter type with a closed mold having a split die to permit removal of the formed article form the die.

It is frequently desirable that the container have a smooth interior surface to provide an acceptable appearance and to avoid possible contamination of the contained substance. Also, a smoothly-finished surface may be more easily coated with a protective covering or film. The provision of such a surface is comparatively simple where there is sufficient draft, as in wide-mouth containers, to permit the use of an ordinary, smooth-surfaced male die which is easily placed in intimate contact with interior surfaces of the container. However, the smoothing of the interior surface of a narrow-necked container or similar article having a single opening therein and further having a restricted cross-sectional area intermediate the opening and the opposite end is more complex, and involves the use of a collapsible male die or other similarly complicated coring means.

Accordingly, it is a principal object of the invention to provide a novel, simple and economical coring means adapted to provide a smooth interior surface in narrow-necked and similar containers manufactured from fibrous pulp material having no seams or similar imperfections which result from parting lines or similar details of construction associated with certain of the prior art coring means. Furthermore, said novel coring means comprises a smooth progressively expansible diaphragm especially adapted to be incorporated in a mass production process involving rapid operation and automatic equipment.

It is a feature of the invention that the process by which narrow-necked containers are manufactured includes a two-step operation of forming the container and smoothing the inner wall of said container whereby the fibers are interfelted in the forming operation and the inner surface of the wall is then properly dimensioned and smoothed by the use of unique coring means in the smoothing operation.

Another object of the invention includes a unique transfer means whereby a formed but undried container is transferred from die to die without being handled by the structures other than die components and whereby those components operate to release and to receive the container gradually, thus minimizing the possibilities of damage during transfer and throughout the molding process.

A preferred embodiment of apparatus for practicing the invention may be understood with reference to the description. Modifications of this apparatus may, of course, be used in the practice of the invention and within its scope and spirit.

The method of manufacture of narrow-necked containers from fibrous pulp material according to the present invention includes the three steps of forming the article, smoothing the interior surface, and drying the article. The forming process involves the introduction of fibrous pulp material into a forming die having an appropriately dimensioned foraminous interior surface, the application of a pressure differential across that surface such that a layer of the pulp material is deposited on the surface, and the draining out of the excess pulp material. The smoothing process involves the introduction of an unexpanded, smooth, progressively expansible diaphragm into the forming die after the layer of pulp is deposited on its interior surface, and the expansion of the diaphragm to place it in intimate contact with the interior surface of the pulp layer so as to produce a smooth, compacted surface. The drying process is carried out with the formed and smooth container held in an appropriate drying die and having the same or a similar smooth, gradually-expandable diaphragm within the container and placed in expanded condition so as to be in intimate contact with the interior surface of the container throughout the drying process.

Still other objects and features will appear from the following description of an embodiment of the invention incorporating the best mode of carrying out the invention. In order that the principles, objects and features of the invention may be readily understood, the preferred embodiment of the closed die molding process and apparatus is illustrated in the accompanying drawings, wherein:

Fig. 3 is a top view in partial section of the forming die taken along line 3—3 of Fig. 4;

Fig. 4 is a sectional view of the forming die and entrance port of the pulp stock supply system taken along line 4—4 of Fig. 3;

Fig. 5 is a sectional view of a portion of the forming die with fibrous pulp material compacted on the interior surface of the die, said section taken along the line 4—4 of Fig. 3;

Fig. 6 is a top view, in section, of the forming die wherein the halves of the forming die are displaced from one another;

Fig. 7 is a view, in partial section, of the smoothing pedestal and perforated post encased by an expansible diaphragm;

Fig. 8 is a sectional view of the forming die on the smoothing pedestal with the diaphragm in expanded position;

Fig. 9 is a view, in partial section, of the drying die with molded article therein being lowered onto a tank for high pressure changing;

Fig. 10 is a sectional view of the valve apparatus associated with high pressure charging of the drying die;

Fig. 11 is a sectional view of means to release the pressure inside the die after the article is dried; and Figs. 12–17 illustrate steps in a method of practicing this invention.

Figure 1:
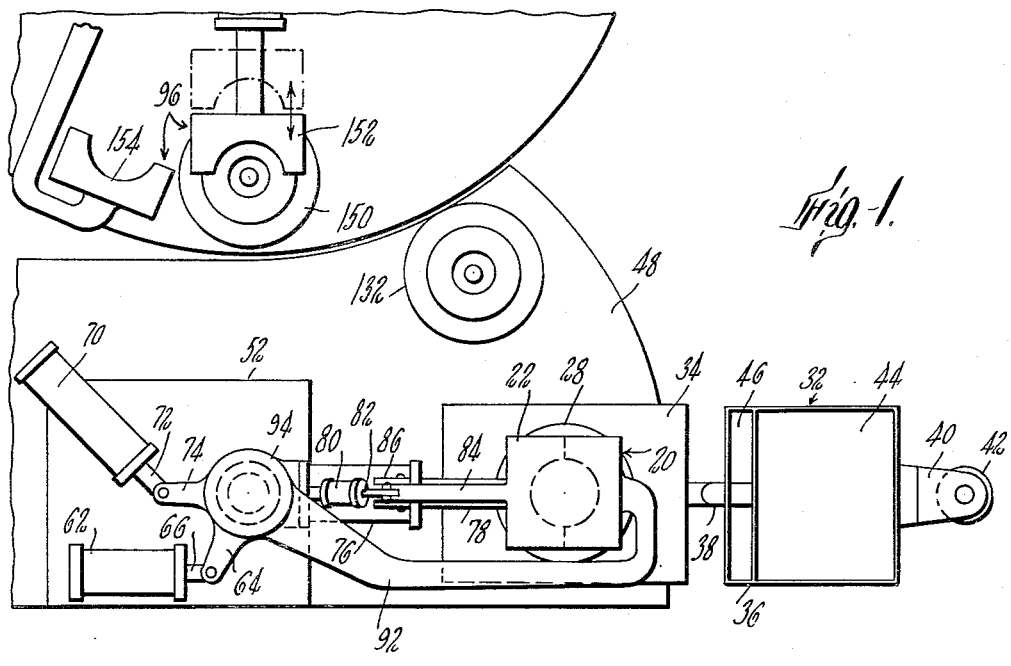
Fig. 1 is a plan view of apparatus embodying the invention, specifically apparatus for the molding of a quart milk bottle from fibrous pulp material.
Figure 2:
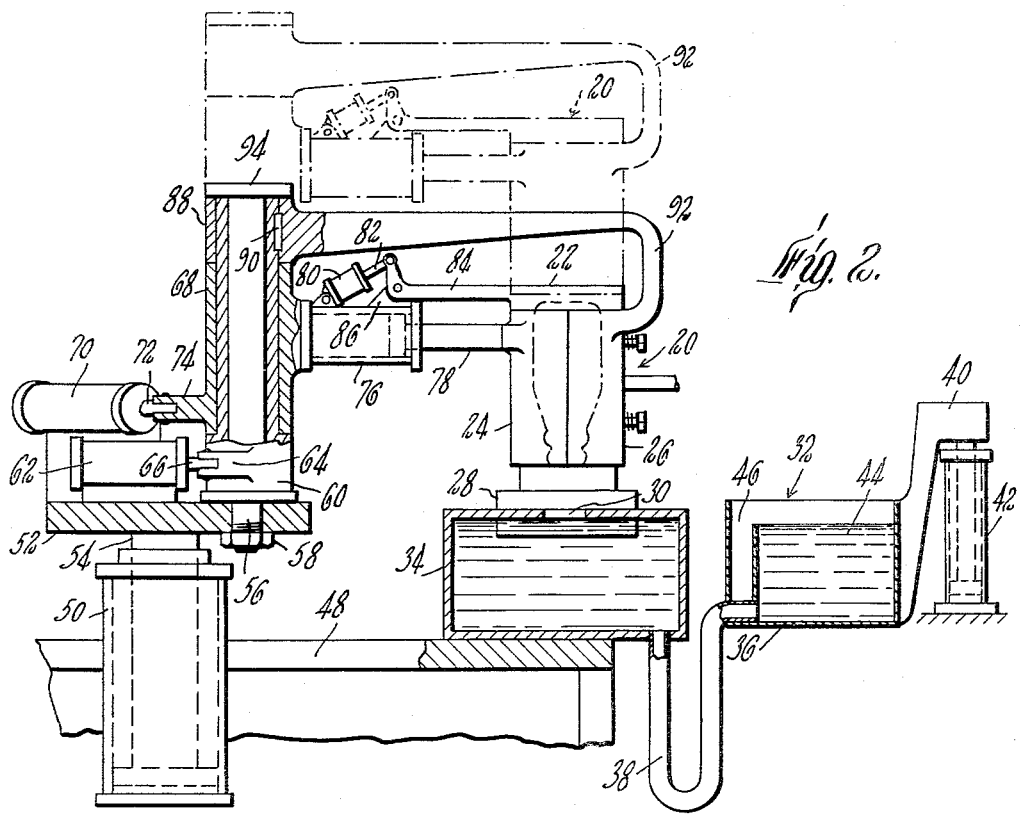
Fig. 2 is an elevational view in partial section of the apparatus.

Referring to Figs. 1 and 2, a forming die 20 comprising a top member 22, a first die half 24 and a second die half 26 is mounted on the forming pedestal 28. A valved port 30 in the pedestal provides communication with the fibrous pulp stock supply system 32 which consists of a closed tank 34, an open lift tank 36 and a conduit 38 connecting the tanks. Means to raise the open lift tank are shown as a support arm 40 connecting the tank wall to the hydraulic cylinder 42, actuation of which will raise the tank 36. The open tank is divided into two sections, a chamber 44 having a volume substantially equal to the capacity of the forming die 20 and an overflow chamber 46. Chamber 44 is directly connected to conduit 38 and thus a predetermined amount of pulp stock may be admitted to the forming die when the lift tank 36 is raised and the valve in the port 30 is opened.

The closed tank 34 and associated apparatus are mounted on a table 48, or other suitable structure. Also supported by the table 48 are mechanisms to move the forming die 20 to certain desired locations which are described in greater detail hereinafter, particularly in conjunction with Figs. 12–17. The piston rod 54 of the hydraulic cylinder 50 is connected to a plate 52 on which is mounted the mechanisms supporting the forming die 20. The cylinder 50 is mounted such that its piston rod 54 may be reciprocated along a vertical line to lift forming die 20 off the pedestal 28.

A group of coaxial members capable of moving parts of the forming die 20 independently of one another are secured to plate 52 by means of a stud 56 and nut 58. A shaft 60, mounted on the plate 52, may be rotated by the coaction of the cylinder 62 and the arm 64 of the shaft 60 to which the piston rod 66 of the cylinder 62 is fastened by an appropriate coupling means. The sleeve 68, positioned on and abutting the flanged surface of the shaft 60, is rotatable independently thereof and such rotation is actuated by the cylinder 70 whose piston rod 72 is pinned to the arm 74 of sleeve 68. Attached to the sleeve 68 is the first die half 24 through cylinder 76 and its associated piston rod 78. The top 22 is pivotable by means of cylinder 80 about a point above the cylinder 76, through coaction of the piston rod 82 and the lever 84 which is pinned to the flange 86 on cylinder 76. The lever 84 is shown cast integrally with top 22. Piston rod 78 is also shown integral with the first die half 24. These details of constructions, as others herein, are merely illustrative and are not to be interpreted as limiting the scope of the invention. A collar 88 is fitted onto the shaft 60 above the sleeve 68 and locked in place by a key 90 so that the collar 88 and shaft 60 rotate as a unit. Integrally cast with the collar is an arm 92 which is connected to the second die half 26. A cap 94 is bolted on the top of shaft 60 and collar 88 to maintain the positional interrelationship of the shaft 60, sleeve 68 and collar 88.

A similar mechanism may be utilized in conjunction with the drying die 96, as is suggested in Figs. 1, and 12–17. Details and purposes of operation of these mechanisms may be better understood in conjunction with the description of the method of manufacturing narrownecked containers of fibrous pulp material hereinafter described.

As hereinbefore pointed out, apparatus used in forming molded articles in accordance with the invention may be divided into three operational groups, forming, smoothing and drying. Apparatus associated with the forming operation may be understood with reference to Figs. 3–6; additional apparatus associated with the smooth operation is shown in Figs. 7–8, and still other apparatus relating to the drying operation is shown in Figs. 9–11. Figs. 1–2 and 12–17 are of particular assistance in regard to the completely integrated molding process of the invention.

Referring to Figs. 3–6, the forming die 20 is positioned on the forming pedestal 28 (as is also shown in Figs. 1, 2 and 12). The die consists of three parts, the top 22, and two die halves 24, 26. Each part (22, 24 and 26) has a hollow chamber 98 between the outer wall 100 of the die part and the mold wall 102. The chambers 98 are connected to a vacuum system through the tubes 104 and 114 which pass through the wall 100 and communicate with the chambers 98, the tubes 104 being primarily drain tubes and hence being connected at a low point therein. In this manner, refuse material does not collect within the chamber, but rather is drawn off through the vacuum system. The mold wall 102, preferably a formed shell of stainless steel, is perforated in a manner to provide communication between the interior of the mold and the vacuum chambers 98. The molding surface of the mold wall 102 as herein shown is shaped in the form of a quart milk bottle, the bulge 105 in the lower portion of the wall as shown in Fig. 4 being furnished to provide an easy means for carrying the bottle when it is full of liquid. Such bottle is chosen as illustrative of one of the variety of shapes and configurations of molded products that may be economically manufactured with the apparatus of this invention. A screen 106 is mounted over the molding surface of wall 102. This screen 106 is in three parts, one part associated with the top 22 and one with each of the two die halves 24, 26. The screen portions over the mold walls of the die halves are preferably given an initial and permanent set so that they normally present an arc of slightly greater radius than that of the mold wall, as shown in Fig. 6 in conjunction with the second die half 26. By the use of a permanent set of such degree in the screen, the formed article may be gradually, smoothly and cleanly gripped or released. The invention may also be practiced with the screen 106 positioned in fixed relationship to the mold wall 102 as particularly shown in Figs. 3–6 in relation to the first die half 24. The screen 106, when given a permanent set of greater radius than the mold wall (as shown in Fig. 6), is mounted on a rib 108 which in turn is supported by two studs 110 which pass through the outer wall 100 and are threaded into the rib. A compression spring 112, positioned over the shank of each stud 110, coacts with the head of the stud and the wall 100 to tend to restrain the screen against the mold wall 106.

The die 20 is lowered onto pedestal 28 by the hydraulic cylinder 50, the positioning of the die on the pedestal being assisted by the entrance of the tubular extension 116 of the die 20 into the flared end of the passageway 118 in the pedestal 28. The die and pedestal are sealed against leakage pressures by the sliding contact of the extension 116 with the wall of the passageway 118 and by the gasket ring 120 which coacts with the circular groove 122 in the base of the die 20. The passageway 118 extends through the pedestal 28 to provide communication between the die 20 and the closed tank 34. The valve structure 30 may be of one of several suitable types well known in the art. A tube 124, connected to an air supply, passes through the wall of the pedestal 28 and upward through the passageway 118 into the interior of the die 20 when it is positioned on the pedestal 28 as shown in Fig. 4. The top of the tube 124 is flared and has a plurality of orifices 126 therein (as shown in Figs. 3 and 4).

The forming operation is as follows: A reduced pressure is created in the chambers 98 by operation of the vacuum system connected through tubes 104 and 114. The lift tank 36 is then raised and fibrous pulp stock 128 from the closed tank 34 is admitted to the mold interior through the valve 30 and passageway 118 so as to fill the entire space therein. A rapid flow of stock into the mold is produced by the pressure differential between the partially evacuated mold cavity and the predetermined head provided by the lift tank. The resultant agitation eliminates fiber flocculation with a resulting maximum pulp fiber interlock. Individual fibers in the pulp stock are compacted in inter-felted relationship in a layer on the screen to form a container wall 130. The lift tank 36 is then lowered and excess pulp drains from the mold interior. Displacement air may be introduced through tube 124 to assist in the removal of the stock. The air is utilized principally to prevent the formation of a reduced pressure environment within the upper portions of the mold interior which might cause damage to the container wall 130. As shown in Fig. 5, a container wall 130 of substantially uniform thickness is formed on the screen 106. A certain amount of liquid is removed from it through the screen and exhausted from chambers 98 into the vacuum system so that the container wall is moderately firm at this stage.

The forming die 20 is then lifted from the forming pedestal 28 by the cylinder 50, rotated by the coincident action of the cylinders 62 and 70 to the smoothing pedestal 132, as shown in Figs. 1 and 13, and lowered onto that pedestal by the cylinder 50. The die 20 is located and sealed thereon by the coaction of the sleeve 116 and the wall of the passageway 134 and the coaction of the gasket ring 136 and the groove 122 as shown in Fig. 8. (In Fig. 8 the rib 108 and associated studs 110 and springs 112 are omitted from the illustration for clarity as these elements are unnecessary to the understanding of the smoothing operation as practiced with the invention.)

Referring to Fig. 7, the smoothing pedestal 132 has mounted within it a perforated or foraminous tube 138 which extends upward through passageway 134 such that when the die 20 is lowered onto the pedestal the top of the tube 138 is placed in proximate relationship with the screen associated with the top 22. The tube 138 is encased with smooth expansible diaphragm 140 graduated in thickness from top to bottom. This feature of gradual expandability may be achieved by other means within the scope of the invention, as for example, by the use of a plurality of materials having different expansibilities placed in appropriate sections of the diaphragm during the fabrication thereof. (The protuberance 141 is to provide a uniform container wall thickness at the bulge 105.) The lower portion of the diaphragm is flared out and clamped by the plate 142 to the pedestal 132. The entire structure is mounted on a support member 144 into which a pipe 146 is threaded. The pipe 146 communicates with an appropriate low pressure source, for example, air or water. A plurality of bleed holes 148 are spaced about the pedestal wall to permit escape of air from the interior of the mold as the diaphragm 140 expands.

The smoothing operation is as follows: Water or another appropriate fluid is admitted to the tube 138 through pipe 146 and the diaphragm 140 is progressively expanded. The portion most remote from the open end is the most resilient and expands first. Thus the formation of pockets of trapped air which would impede contact between the interior wall of the container 130 and the outer surface of the diaphragm 140 is prevented. The diaphragm assumes the shape shown in Fig. 8, when fully expanded, pressing against the container wall 130 such as to smooth its interior surface. Any additional liquid pressed out of the formed pulp container wall will be exhausted through the vacuum system which has remained connected to the chambers 98 and continuously maintains a vacuum causing the container wall 130 to adhere to the screen 106. The diaphragm 140 preferably remains expanded for a predetermined length of time, and then is gradually contracted about the tube 138 as the water is withdrawn. There is no adherence of pulp particles to the diaphragm as the prior forming step produced an inter-felted fiber layer in which each pulp fiber is securely bound to several others.

When the diaphragm has been fully contracted, the die 20 is lifted off the smoothing pedestal 132 by cylinder 50. Atmospheric pressure is admitted to the chambers 98 in the top 22 and the second die half 26. The top 22 is then lifted by cylinder 30 and the first die half 24 is withdrawn from the second die half 26 by cylinder 76. The vacuum system remains connected to half 24 such that the molded container is securely held therein, as shown in Figs. 6 and 14. As the die half 24 is withdrawn with the container 130 held therein, the screen 106 and rib associated with half 26 move forward (as shown in Fig. 6). Due to the pre-stressing of the resilient screen 106 such that it naturally has a larger radius, the extremities thereof tend to move away from the container wall 130, thus releasing it. In this manner the container is readily freed from the mold screen 106. The second die half 26 is then rotated back to the forming pedestal 28 by cylinder 62 and the first die half 24, carrying the container, is rotated forward to the drying pedestal 150 by cylinder 70 (Fig. 15). At the drying pedestal 150 the container is transferred from the forming die half 24 to a drying die member 152, mounted on similar equipment (shown in Fig. 15) and incorporating a rib-screen construction similar to that of the second die half 26 (Fig. 6). Cylinder 76 advances the forming die half 24 with the container held therein to mate with the drying die member 152 in the position as shown in Fig. 16. Vacuum is then applied to the drying die member 152 and is released from half 24. The container is then held by the drying die member 152 and the forming die half 24 is withdrawn by cylinder 76 and rotated back to the forming pedestal 28 by cylinder 70 where the halves 24 and 26 are reconnected (Fig. 17) with top 22. The interior of the forming mold is cleaned by a water shower (not shown) and then is ready to commence another forming operation.

The container 130 has thus been transferred to member 152 and is held therein. The drying die members 152 and 154 are now aligned and member 152 advances to mate with member 154, the drying die being completed by a top member (not shown) similar to the forming die top 22. The drying die 96 is then lowered onto a drying pedestal 158.

Referring to Fig. 9 the upper portion of the drying pedestal 158 is similar to the upper portion of the smoothing pedestal 132, comprising a foraminous tube 160 having a progressively expansible diaphragm 162 thereon, said diaphragm being clamped in position by a plate 164. The lower portion of the drying pedestal 158 contains a ball check valve structure, the body of which consists of a top casting 166 and a bottom casting 168. The top casting has an aperture therein for communication with the tube 160. Surrounding this aperture are four flanges 170 spaced 90° apart. One edge of each flange is parallel to the base of the casting and the other edge at right angles thereto to form a positioning stop for the ball check 172. The bottom casting 168 has a cylindrical recessed portion 174 of greater diameter than the ball 172. The base of the recess 174 is tapered to a cylindrical passageway 176 which is concentric with the recess 174. The ball 172 normally seats itself on the circular junction of the wall of the passageway 176 and the base of the recess 174. The passageway 176 is extended by a cylindrical tube 178 pressed into the bottom casting 168. In the end portion of tube 178 opposite the casting 168 are a plurality of circumferentially-spaced holes 180.

The drying die 156 and the drying pedestal 158 (including the ball check valve structure) are designed to be moved as a unit as shown in the illustrated embodiment. In this manner, the container is held within the drying die with the diaphragm in expanded condition throughout the drying process. Thus the container wall 130 is positioned between the screen of the drying die and the diaphragm such that physical changes in the wall structure caused by elevated temperatures, as for example, bursting of steam pockets or similar pockets of occluded gas are minimized or eliminated. It is understood that many modifications obvious to one skilled in the art may be made in the apparatus, such as changing the valve structure or using a single diaphragm in both the smoothing and drying operations, within the scope of the invention.

The operation of the drying portion of apparatus may be best understood with reference to Figs. 9, 10 and 11. Thus, the drying die 156 and associated pedestal 158 are lowered by appropriate means onto a valved port 182 in a high pressure tank 184. The fluid within the source may be water for example. The valve mechanism in the port 182 comprises a valve body 186, a sleeve bushing 188, and plunger 192. Packing material 190 between the lower edge of the bushing 188 and a lip on the valve body 186, provides a sealing means for the plunger 192. A plurality of passageways 194, radially positioned in the lower portion of the valve body 186 provide communication between the high pressure tank 184 and the tube 160, through the tube 178 and the ball check valve, when the holes 180 are in registration with the passageways 194 (as shown in Fig. 10). The passageways 194 are normally closed by the plunger 192, maintained in its uppermost position by thte pressure differential between the atmospheric pressure acting on the top surface of the plunger and the high pressure fluid acting on the opposite surface. When the plunger is raised, the flange 198 abuts the lower surface 200 of the valve body 186.

As the pedestal 158 and die 156 are lowered into the tank 184, the tube 178 enters the tapered bore 202 of the bushing 188 and contacts the plunger 192, driving it downward. The downward travel of the pedestal and die is stopped when the lower surface of the casting 168 contacts the upper surface of the bushing 188 (Fig. 10). In this position, the holes 180 are in registration with the passageways 194 and fluid under pressure flows into the tube 178, raises the ball 172 against the flange 170 and flows past the ball 172 into the tube 160, expanding the diaphragm against the container wall 130. When equilibrium is reached the ball 172 seats itself, due to gravity, closing the upper valve. The pedestal 158 and die 156 then are lifted off the tank 184, allowing the plunger 192 to rise and close the lower valve.

The pedestal 158 and die 156 then enter an appropriate drying environment, such as an oven, and the container held therein under pressure is dried.

On completion of the drying cycle, the pedestal 158 and die 156 are lowered over a trip rod 204 as shown in Fig. 11. The rod 204 contacts the ball 172 and raises it, opening the valve and releasing the fluid within the diaphragm. When the diaphragm is contracted, the die 156 is lifted off the pedestal 158 and is separated so that the completed container may be removed.

Having thus described a preferred embodiment of the invention, it will be seen that the invention provides a novel method and apparatus especially useful in the manufacture of certain types of narrow-necked containers wherein a smooth interior surface is desired from fibrous pulp material. Other constructions and methods not herein disclosed within the spirit of the invention and the scope of the appended claims will be apparent to those skilled in the art.

I claim:

1. In pulp molding apparatus for forming generally cylindrical molded pulp articles, said apparatus including a segmental forming die constructed from at least two arcuate foraminous separable die segments, and means for moving said die segments relative to each other to open and close the die, the improvement comprising an arcuate screen detachably secured covering the forming surface of at least one of said die segments, said screen having a normal radius of curvature greater than the radius of curvature of the die segment on which it is mounted when the screen is detached therefrom in the open condition of the die during the removal of molded pulp articles therefrom, and means for securing said screen against said one die segment and restraining the screen thereagainst to cause the screen to have substantially the same radius of curvature as that of said one die segment when the die is in its closed condition during molding operations.

2. The apparatus defined by claim 1, wherein said screen securing and restraining means comprises a support to which the screen is attached, and means mounting said support for movement towards and away from said one die segment to detachably secure the screen thereon.

3. The apparatus defined by claim 2, wherein said support and mounting therefor comprise an axially movable stud mounted slidably in said one die segment, and spring means normally urging the stud to carry the screen towards the die segment to secure and restrain the screen thereagainst.

4. Apparatus for the manufacture of narrow-necked molded pulp containers having a body portion of greater cross-sectional area than the neck thereof comprising an internal forming die having at least two separable split die portions providing a narrow bottom neck opening, each of said portions being foraminous for passage of liquid therethrough, means for moving said forming die portions toward and away from one another with said die portions in contact with one another in closed position and spaced from one another in open position, means for introducing a liquid fiber mixture to the neck opening of said forming die with the portions thereof in closed position, means for applying a reduced pressure to the exterior surface of said forming die with said portions thereof in closed position to accrete thereon fiber in the form of a narrow-necked molded pulp container, an internal drying die having at least two separable split die portions providing a narrow bottom neck opening, each of said portions being foraminous for passage of liquid therethrough, means for transferring an accreted container from said forming die to said drying die, including means for opening said forming die portions, swinging one of said forming die portions while maintaining reduced pressure thereon to carry said one forming die portion with said container to a position adjacent one of the die portions of said drying die, closing said one forming die portion with said one drying die portion and applying a reduced pressure to said one drying die portion to maintain said container therein, and opening said one forming die portion and said one drying die portion while maintaining said container in said drying die portion.

5. Apparatus for the manufacture of narrow-necked molded pulp containers having a body portion of greater cross-sectional area than the neck thereof comprising an internal forming die having at least two separable split die portions providing a narrow bottom neck opening, each of said portions being foraminous for passage of liquid therethrough, means for moving said forming die portions toward and away from one another with said die portions in contact with one another in closed position and spaced from one another in open position, means for introducing a liquid fiber mixture to the neck opening of said forming die with the portions thereof in closed position, means for applying a reduced pressure to the exterior surface of said forming die with said portions thereof in closed position to accrete thereon fiber in the form of a narrow-necked molded pulp container, an internal drying die having at least two separable split die portions providing a narrow bottom neck opening, each of said portions being foraminous for passage of liquid therethrough, means for transferring an accreted container from said forming die to said drying die, means for smoothing the formed container maintained in said drying die in closed position comprising a rigid tubular member extending upwardly for a distance almost as great as the length of said drying die, an expansible diaphragm surrounding said tubular member, means for moving said tubular member into and out of operating position within said drying die, and means for introducing fluid into said diaphragm to expand said diaphragm into contact with the surface of a container accreted within said drying die.

6. The apparatus of claim 5 wherein said transfer means include means to gradually grip or release said layer.

7. Apparatus for the manufacture of narrow-necked molded pulp containers having a body portion of greater cross-sectional area than the neck thereof comprising an internal forming die having at least two separable split die portions providing a narrow bottom neck opening, each of said portions being foraminous for passage of liquid therethrough, means for moving said forming die portions toward and away from one another with said die portions in contact with one another in closed position and spaced from one another in open position, means for introducing a liquid fiber mixture to the neck opening of said forming die with the portions thereof in closed position, means for applying a reduced pressure to the exterior surface of said forming die with said portions thereof in closed position to accrete thereon fiber in the form of a narrow-necked generally cylindrical molded pulp container, an internal drying die having at least two separable split die portions providing a narrow bottom neck opening, each of said portions being foraminous for passage of liquid therethrough, means for transferring an accreted container from said forming die to said drying die, including means for opening said forming die portions, swinging one of said forming die portions while maintaining reduced pressure thereon to carry said one forming die portion with said container to a position adjacent one of the die portions of said drying die, closing said one forming die portion with said one drying die portion and applying a reduced pressure to said one drying die portion to maintain said container therein, and opening said one forming die portion and said one drying die portion while maintaining said container in said drying die portion, means for smoothing the formed container maintained in said drying die in closed position comprising a rigid tubular member extending upwardly for a distance almost as great as the length of said drying die, an expansible diaphragm surrounding said tubular member, means for moving said tubular member into and out of operating position within said drying die, and means for introducing fluid into said diaphragm to expand said diaphragm into contact with the surface of a container accreted within said drying die.

8. Apparatus for the manufacture of narrow-necked generally cylindrical molded pulp containers having a body portion of greater cross-sectional area than the neck thereof comprising an internal forming die having at least two separable generally semi-cylindrical split die portions providing a narrow bottom neck opening and a generally semihemispherical top portion, each of said portions being foraminous for passage of liquid therethrough, means for moving said forming die portions toward and away from one another with said die portions in contact with one another in closed position and spaced from one another in open position, screen means on the internal surface of said semi-cylindrical portions, said screen means having a normal radius of curvature greater than that of its cooperating semi-cylindrical portion but being restrained to the same radius of curvature of its cooperating portions with said die closed, means for introducing a liquid fiber mixture to the neck opening of said forming die with the portions thereof in closed position, means for applying a reduced pressure to the exterior surface of said forming die with said portions thereof in closed position to accrete thereon fiber in the form of a narrow-necked generally cylindrical molded pulp container, an internal drying die having at least two separable generally semi-cylindrical split die portions providing a narrow bottom neck opening and a generally semihemispherical top portion, each of said portions being foraminous for passage of liquid therethrough, means for transferring an accreted container from said forming die to said drying die, including means for opening said forming die portions, swinging one of said forming die portions while maintaining reduced pressure thereon to carry said one forming die portion with said container to a position adjacent one of the die portions of said drying die, closing said one forming die portion with said one drying die portion and applying a reduced pressure to said one drying die portion to maintain said container therein, and opening said one forming die portion and said one drying die portion while maintaining said container in said drying die portion, means for smoothing the formed container maintained in said drying die in closed position comprising a rigid tubular member extending upwardly for a distance almost as great as the length of said drying die, an expansible diaphragm surrounding said tubular member, said diaphragm being of graduated expandibility generally throughout its length such that the more expandible end is remote from the open end of said drying die when the diaphragm is positioned therein, means for moving said tubular member into and out of operating position within said drying die, and means for introducing fluid into said diaphragm to expand said diaphragm into contact with the surface of a container accreted within said drying die, and means for heating said drying die to dry said container while said diaphragm remains in pressure contact therewith.

References Cited in the file of this patent

UNITED STATES PATENTS

| | | |
|---|---|---|
| 710,694 | Howard | Oct. 7, 1902 |
| 825,274 | Kneuper | July 3, 1906 |
| 989,994 | Moses | Apr. 18, 1911 |
| 1,149,669 | Maursberger | Aug. 10, 1915 |
| 1,169,064 | Ayerst | Jan. 18, 1916 |
| 1,265,162 | Ayerst | May 7, 1918 |
| 1,324,935 | Sims | Dec. 16, 1919 |
| 1,653,007 | Hall | Dec. 20, 1927 |
| 2,222,003 | Sloan | Nov. 19, 1940 |

FOREIGN PATENTS

| | | |
|---|---|---|
| 25,910 | Australia | Apr. 2, 1931 |
| 668,262 | Great Britain | Mar. 12, 1952 |